United States Patent [19]

Rubinstein et al.

[11] 4,101,380

[45] Jul. 18, 1978

[54] PROCESS FOR THE CROSS-LINKING OF PROTEINS

[75] Inventors: Menachem Rubinstein, Kiryat Ono; Shulamit Simon, Ramat-Gan, both of Israel; Rene Bloch, deceased late of Savion, Israel, by Rachel Bloch, administratrix

[73] Assignee: Research Products Rehovot Ltd., Rehovot, Israel

[21] Appl. No.: 695,030

[22] Filed: Jun. 11, 1976

[30] Foreign Application Priority Data

Jun. 12, 1975 [IL] Israel ........................ 47468

[51] Int. Cl.$^2$ .................... C07G 7/02; C07G 7/00
[52] U.S. Cl. ........................ 195/63; 195/68; 195/DIG. 11; 260/112 R; 260/122
[58] Field of Search ............. 195/63, 68, DIG.11; 260/112 R, 117, 122

[56] References Cited

U.S. PATENT DOCUMENTS

| | | | |
|---|---|---|---|
| 3,796,634 | 3/1974 | Haynes et al. ................ | 195/63 |
| 4,009,267 | 2/1977 | Huber et al. ................ | 260/112 R |

OTHER PUBLICATIONS

Wold in Hirs (Editor) Methods in Enzymology, vol. XI (1967), pp. 617–640.

Primary Examiner—Lionel M. Shapiro

Attorney, Agent, or Firm—Millen & White

[57] ABSTRACT

The invention relates to a process for the cross-linking of proteins wherein the proteins to be cross-linked are reacted with a cross-linking agent selected from the group consisting of:

(a) water soluble poly(ethylene oxide) derivatives of the general formula I $$(Z)_m-Y-(CH_2CH_2O)_nCH_2CH_2-Y-(Z)_m \qquad (I)$$

wherein both n and m are at least 1; Y is a covalent bond or is an —R— or —RO— radical in which the oxygen is bound to the poly(ethylene oxide) and R is selected from the group consisting of methylene, ethylene, propylene, o—, m— and p-phenylene, o—, m— and p-phenylene carbamate optionally substituted by one or more alkyl, aryl, halo, nitro, oxo, carboxy, hydroxy, thio, sulfonate and phosphate groups; and Z is a reactive group selected from the groups consisting of halo-isocyanato-, isothiocyanato-, tosylate, acyl halides, acyl azides, aryl diazonium salts, acyl imidoester salts, activated esters of acyl residues and 2,4-dichlorotriazines; and (b) activated esters of di- and poly-carboxylic acids wherein the acids and the alcohol moieties thereof are water soluble.

31 Claims, No Drawings

PROCESS FOR THE CROSS-LINKING OF PROTEINS

The present invention relates to a process for cross-linking of proteins. More specifically the present invention relates to the novel use of new and known compounds for cross-linking of proteins and especially of enzymes.

Enzymes have been used extensively in industrial processes both in soluble and insoluble form. The use of soluble enzymes for industrial processes, however, is limited by their cost, their instability, and the difficulties in recovering them after the operation.

These disadvantages have been circumvented by a new technology based on enzyme immobilization, i.e. enzyme attachment to solid support materials. A number of techniques have been developed for enzyme immobilization, of which the major ones are intra molecular cross-linking and covalent linking to supports. Support materials in different forms - beads, membranes and fibers - can be used. The most common support material for enzyme reactors are beads or porous particles which can be packed into columns or used in stirred-tank reactors. Another form is the sheet or membrane form which can be used in pressure cells.

The advantage of utilising such immobilized or insoluble enzymes resides in the possibility of acting catalytically with an enzyme on a substrate stream in a continuous way with no need of separating the enzyme from the product obtained by the catalytic reaction. Thus, the use of certain insoluble enzymes for the performance of enzymatic reactions is known and the following known methods of use can be mentioned, for example:

1. The insoluble enzyme particles are suspended in a tank with stirring, the out-going flux passing through a filter; and
2. The insoluble enzyme particles are packed into a column which is continuously flown through by the substrate.

More recently in our Israel Pat. specification No. 46 178 we have described and claimed a method for the performance of enzymatic reactions which comprises applying pressure to an aqueous solution of a substrate, which substrate may be chemically altered by way of an enzymatic reaction, causing thereby said solution to flow through a cross-linked enzyme membrane (as defined) and removing from the solution the product obtained by methods known per se.

An enzymatic membrane in connection with said process was defined as meaning a microporous membrane in the pores of which enzymes are cross-linked by way of a bifunctional coupling agent.

The present invention relates to the discovery of several new classes of multifunctional compounds which can serve as cross-linking agents for proteins and especially enzymes and which are utilizable in any context wherein cross-linked proteins and enzymes are required.

Cross-linking agents of proteins are bi- or multi-functional compounds capable of covalently binding with proteins to form either a long chain or a three dimensional polymeric structure as explained. Cross-linking agents are useful for enzyme immobilization in various modifications. Thus enzymes can be insolubilized by cross-linking them alone or in the presence of a co-protein and usually enzymes are cross-linked within a water insoluble support.

The advantages of using multifunctional reagents as insolubilizing agents is that one reagent can be used to prepare different types of immobilized enzymes. The method is simple and non-specific.

The preparation of water insoluble enzyme-derivatives using multifunctional reagents, involves the covalent bond formation between molecules of the enzyme and the reagent to give intermolecularly cross-linked species.

Multi-functional reagents, i.e., cross-linking agents, can be used in several ways for the cross-linking of proteins, e.g.:

(a) The pure enzyme or protein is reacted with the cross-linking agent to form three-dimensional species which are completely insoluble in water, or complex oligomeric soluble derivatives;
(b) The enzyme is cross-linked in the presence of a second protein, to form a co-cross-linked derivative;
(c) The enzyme is first adsorbed on an insoluble, surface-active support and then cross-linked intermolecularly with a multifunctional reagent; or
(d) The enzyme can be cross-linked to a protein matrix.

Many cross-linking agents have been described and used in the past. Usually these are low molecular weight bifunctional reagents capable of binding with various sites of proteins. Some of them are soluble in water and usually they are very reactive and non-selective. Thus diisocyanates may react with amino, thiol and hydroxyl residues of proteins as well as with water. Glutardialdehyde which has been extensively used in the past is also nonselective. In some cases a reduced enzymatic activity may be explained by inactivation caused by the chemical alteration with the cross-linking agent. The following properties of a cross-linking agent for enzymes are required:

(1) A complete insolubilization should be obtained.
(2) The enzymatic activity should not be greatly reduced.
(3) A chemically stable bond should be formed.

It is quite obvious that rather mild conditions during cross-linking are preferred, and extreme pH and temperature values as well as high concentration of organic solvents should not be used as these may cause a considerable inactivation of some enzymes.

A group of cross-linking agents which reacts selectively with amino groups consists of activated esters of di-carboxylic acids. Compounds such as di-p-nitro-phenyl glutarate (I) and di-p-nitrophenyl sebacate (II) are typical examples:

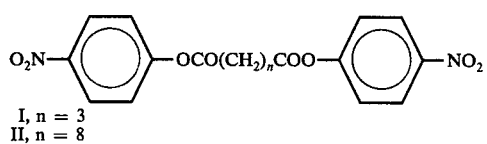

I, n = 3
II, n = 8

The main advantage of these cross-linking agents is their selectivity towards amine residues such as ε-amino lysine and α-amino acids. Modification of these amine residues usually does not greatly reduce enzymatic activity. The use of these cross-linking agents is practically limited for the following reasons: 1. These compounds are practically water insoluble and therefore cannot be used in high concentrations, as a result the rate of cross-linking is very slow. 2. In those cases described in literature, p-nitrophenyl esters are used and therefore the reaction can be performed only at basic pH values such as pH 8 or higher. A combination of long time and high pH might cause a considerable enzyme inactivation. 3. "Most of the reagents used are too short; longer reagents are too hydrophobic and cause denaturation... of the protein..." (H. Fasold et al. Angew.Chem. 83, 875)(1971).

Therefore, the main advantage of the above-mentioned cross-linking agents, namely their selectivity towards aminofunctions and the formation of new stable amide bonds, cannot be fully expressed. In light of the above the present invention provides a novel family of cross-linking agents which are water soluble and which include agents of various and variable lengths suitable and tailorable for use with different proteins and enzymes and which react with protein under mild conditions.

Thus, the present invention provides a process for the cross-linking of proteins wherein the proteins to be cross-linked are reacted with a cross-linking agent selected from the group consisting of:

(a) water soluble poly(ethylene oxide) derivatives of the general formula I $$(Z)_m-Y-(CH_2CH_2O)_nCH_2CH_2-Y-(Z)_m \qquad (I)$$

wherein both $n$ and $m$ are at least 1; Y is a covalent bond or is an —R— or —RO— radical in which the oxygen is bound to the poly(ethylene oxide) and R is selected from the group consisting of methylene, ethylene propylene, o—, m— and p-phenylene, o—, m— and p-phenylenecarbamate optionally substituted by one or more alkyl, aryl, halo, nitro, oxo, carboxy, hydroxy, thio, sulfonate and phosphate groups; and Z is a reactive group selected from the groups consisting of haloisocyanato-, isothiocyanato, tosylate, acyl halides, acyl azides, aryl diazonium salts, acyl imidoester salts, activated esters of acyl residues and 2,4-dichloro-triazine; and (b) activated esters of di- and poly-carboxylic acids wherein the acid and the alcohol moieties thereof are water soluble.

In effect the process of the present invention involves the use of cross-linking agents falling into two main categories, i.e. water soluble cross-linking agents based on poly(ethylene oxide) derivatives of group (a) which compounds are in themselves novel and the activated esters of di- and poly-carboxylic acids wherein the component acids and alcohols are in themselves known but which heretofor have not been combined to form cross-linking agents.

Referring to the poly(ethylene oxides) derivatives it is to be understood in the description and claims herein that the term "acyl" includes a group obtainable not only from an organic acid but also from an oxygen-containing inorganic acid by the removal of a hydroxyl group, for example, sulphuric acid and phosphoric acid, however, preferred acyl groups will be those derived from carboxylic acids.

Some examples of halo-, α-haloacyl and tosylate derivatives, having the general formula I, contemplated as being within the scope of the present invention include these compounds in which Z is selected from the group consisting of F, Cl, Br, I and tosylate; $m$ is at least and preferably 1; and Y is selected from the grouping consisting of: a covalent bond;

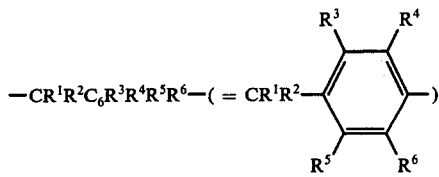

wherein the poly(ethylene oxide) is bound to the aromatic moiety, 2,4-dinitrophenyl-5-oxy-

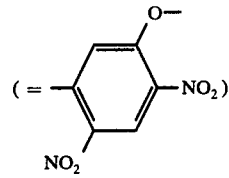

wherein the poly(ethylene oxide) is bound to the oxy;

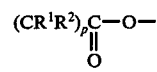

wherein the poly(ethylene oxide) is bound to the oxy and $p$ is at least 1;

wherein the poly(ethylene oxide) is bound to the oxy;

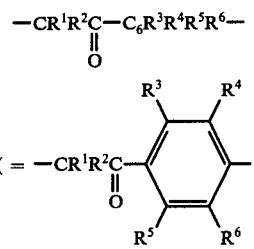

wherein the poly(ethylene oxide) is bound to the aromatic moiety, and wherein $R^1$, $R^2$, $R^3$, $R^4$, $R^5$ and $R^6$ are selected from the group consisting of hydrogen, halo-, nitro, hydroxy, alkyl, aryl, carboxy, sulfonate and phosphate; and wherein $n$ is at least 1 and preferrably between 5 and 500. Specific examples are:

Z=I, m=1, Y=a covalent bond and n=71;
Z=F, m=1, Y=2,4-dinitrophenyl-5-oxy-, and n=71;
Z=Cl, m=1,

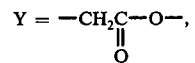

and n=71;
Z=Br, m=1,

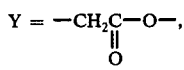

and n=71;
Z=tosylate (=CH$_3$C$_6$H$_4$SO$_3$—), m=1, Y=a covalent bond and n=15, and
Z=Cl, m=1, Y=—CH$_2$C$_6$H$_4$—, and n=71.

Some aryl diazoniums, aryl isocyanates and aryl isothiocyanates represented by the general formula I may be those in which Z is selected from the group consisting of —N$_2$$^+$, —NCO and —NCS; m is at least 1 and preferrably between 1 and 3; Y is selected from the group consisting of o—, m— and p-phenylene, o—, m— and p-phenylene oxy, o—, m— and p-phenylene carbamate, o—, m— and p-phenylene carboxy, and all of these optionally substituted by one or more alkyl aryl, halo, nitro, carboxy and sulfonate; and n is at least 1 and preferrably between 5 and 500. Specific examples are:
Z=—NCO, m=1, Y=—C$_6$H$_3$(CH$_3$)—NHCOO—, n=71;
Z=—NCS, m=1, Y=—C$_6$H$_3$(NO$_2$)—O—, n=150; and Z=N$_2$$^+$.HCl, m=1, Y=C$_6$H$_4$, n=71.

Some acyl halides, acyl azides, acyl imino esters and activated esters represented by the general formula I will be those in which Z is selected from the group consisting of

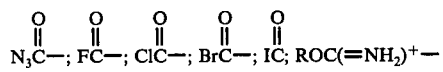

wherein R is selected from methyl, ethyl, propyl, isopropyl, butyl and sec-butyl. (Preferrably methyl, ethyl and propyl);

wherein R is selected from the group consisting of p-nitrophenyl-, o-nitrophenyl-, 2,4-dinitrophenyl, N-hydroxysuccinimide, N-hydroxyphtalimide, 2-thiopyridine, 4-thiopyridine, 1-hydroxybenzotriazole and 8-hydroxyquinoline; m is at least 1, preferably 1 to 2; and Y is selected from the group consisting of —CR$^1$R$^2$—O and

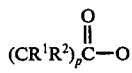

wherein, p is at least 1, preferrably 1 to 4 and R$^1$ and R$^2$ are selected from the group consisting of hydrogen, halogen, alkyl, aryl, nitro and carboxy; o, m and p-phenylene, o, m and p p-phenylene oxy wherein the poly(ethylene oxide) is bound to the oxy, o, m and p-phenylene carboxy wherein the poly(ethylene oxide) is bound to the carboxy, o, m and p-phenylene carbamate wherein the poly(ethylene oxide) is bound to the carbamate; and o, m and p C$_6$H$_4$CH$_2$O wherein the poly(ethylene oxide) is bound to the oxy and wherein the aromatic moieties are further optionally substituted by one or more alkyl, aryl, halo, nitro and carboxy residues. Specific examples are:

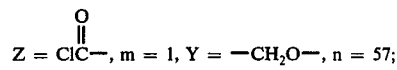

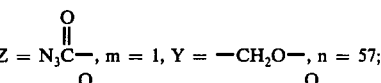

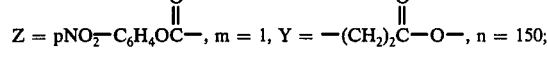

Z=Cl$^-$.CH$_3$OC(=NH)—, m=1, Y=—CH$_2$O—, n=57; and

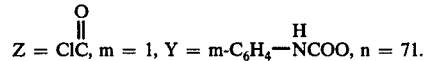

In a preferred embodiment of the process of the present invention there are used water soluble α,ω-dicarboxylic acid derivatives of poly(ethylene oxide) of the general formula II

wherein n is at least 1;
Y' is selected from the groups consisting of
(i) arylene carbamate, optionally substituted by one or more alkyl, aryl, halo and nitro groups
(ii) —(CR$_1$R$_2$)$_p$O—; and

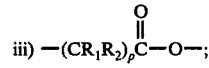

in which p is at least 1, the oxygen is bound to the poly(ethylene oxide) and
R$_1$ and R$_2$ are each selected from the group consisting of hydrogen and halogen atoms, nitro, and carboxylic groups and straight and branch chain alkyl and aryl groups optionally substituted by one or more halogen atoms and nitro and carboxyl groups; and X is a halo, or azido group or a thio or oxy residue which forms an activated ester with the parent α,ω-dicarboxylic acid.

The term activated esters as used herein is directed to those esters of known carboxylic acid groups useful in peptide bond formation, having a high rate of ammonolysis and formed from acidic alcohols such as o— and p-nitrophenol, 2-4-dinitrophenol, N-hydroxy-succinimide, N-hydroxyphtalimide, 2- and 4-thiopyridine, 8-hydroxyquinoline and 1-hydroxybenzotriazole.

Preferred are the activated esters of N-hydroxy-succinimide, 2- and 4-thiopyridine, 8-hydroxyquinoline and 1-hydroxybenzotriazole.

In another preferred embodiment of the present invention there are used diacid salts of diimido alkyl esters of poly(ethylene oxide) derivatives of the general formula III HA.R$_3$OC(=NH)—Y'—(CH$_2$CH$_2$O)$_n$CH$_2$C-
H$_2$—Y'—C(=NH)OR$_3$HA         (III)

wherein n and Y' are as defined in formula II above, R$_3$ is an alkyl residue e.g., methyl, ethyl, propyl, isopropyl, butyl, sec.-butyl and HA is an acid, e.g., hydrochloric, hydrobromic, sulfuric and phosphoric acids.

Referring to formulas II and III, $R_1$ and $R_2$ are preferably alkyl or hydrogen and $R_3$ is preferably methyl or ethyl.

When $R_1$ and $R_2$ represent alkyl groups there come into consideration straight chained and branched lower and medium molecular weight alkyl groups, and there are preferred those groups containing 1 to 6 carbon atoms, for example methyl, ethyl, propyl, isopropyl, n-butyl, tert.-butyl and n-hexyl groups.

Similarly preferred are compounds in which $m$ is a whole number from 1 to 4 however as $n$ increases thus increasing the water solubility of the compound, $m$ can also increase.

It is especially in compounds wherein $m$ and $n$ are relatively large that $R_1$ and $R_2$ and substituents thereon are contemplated as being carboxyl and other such groups.

Furthermore since said derivatives are usually prepared from the long chain water soluble compound, poly(ethylene oxide) $n$ will preferably be between 5 and 500.

Another compound utilizable within the process of the present invention is di-(2,4-dichlorotriazine)-poly(ethylene oxide). Although said compound had already been described in a literature e.g., Comp. Rend. 256: 1528 (1963 (CA 58 114786)) it has never been used as a cross-linking agent.

Referring now to the group (b) of compounds utilizable in the process of the present invention it has been found that by selecting certain water soluble alcohols and carboxylic acids, there are produced novel esters with an increased water solubility. In particular, highly polar water soluble acids such as tartaric acid, citric acid, malic acid, dimethoxysuccinic acid and trimethoxyglutaric acid, when esterified with acidic alcohols such as N-hydroxysuccinimide, 1-hydroxbenzotriazole, 8-hydroxyquinoline, 2- and 4-thiopyridine will produce water soluble activated esters. Moreover, these esters, contrary to p-nitrophenyl esters, are already active at pH values higher than 5. Using these esters, cross-linking can be affected in mixtures consisting of water and a low organic solvent concentration; the reaction is complete in a short time and at neutral pH.

A general method of preparing activated esters of carboxylic acids (according to Anderson et al, J.Amer.-Chem.Soc., 86: 1839 (1964)) for use in the process of the present invention could be as follows:

A carboxylic acid (1 mol) and suitable acidic alcohol (1 mol) are dissolved in a minimal volume of anhydrous ethyl acetate. The solution is cooled in an ice bath and a 20% w/v solution of dicyclohexyl-carbodiimide (1 mol) in ethyl acetate is added with stirring. The reaction mixture is stirred 1 hr at 0° C and 3–5 hrs at room temperature. Dicyclohexyl urea which precipitates is filtered and washings are extracted with equal volume of water, dried over sodium sulfate filtered and concentrated at a reduced pressure. The product is precipitated with either ether or petroleum ether. The yield is 40–90%.

The preparation of several cross-linking agents for use in the process of the present invention will now be described for illustrative purpose only:

POLY(ETHYLENE OXIDE) DISUCCINATE

Poly(ethylene oxide) (Av. mol. wt. 600) (12 g) was dissolved in pyridine (150 ml). The solution was rendered anhydrous by concentration in vacuo to about 100 ml. Succinic anhydride (10 g) was then added and the sealed solution was left for 24 hrs at room temperature. Water (30 ml) was then added and after 1 hr at room temperature, the mixture was evaporated to dryness in vacuo. The residue was dissolved in water (100 ml) and treated with the cation exchanger Doex$^{(R)}$50 (H$^+$) (50 g) during 1 hr with stirring. The mixture was then filtered and the Doex$^{(R)}$50 was washed with water (two 50 ml portions). The combined filtrate and washings were evaporated to dryness in vacuo. The residue was dissolved in benzene (250 ml) and the last traces of water were removed by azeotropic distillation. Excess succinic acid which is insoluble in benzene was removed by filtration and the product was obtained upon evaporation of the benzene. The yield was 16 g (100%). The oily product was checked by titration of carboxylic residues; it gave a neutral equivalent of 394 (theoretical; 400). In the above procedure there is obtained a compound of the general formula IV

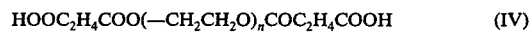

wherein $n$ is 15; however by using a different commercially available poly(ethylene oxide) there are obtained compounds of general formula (IV) wherein $n$ is any value from 2 to 500.

DI-N-HYDROXYSUCCINIMIDE ESTER OF POLY(ETHYLENE OXIDE)DISUCCINATE (MX-54)

Poly(ethylene oxide) di-succinate (Mol. Wt. 800) (16 g) and N-hydroxysuccinimide (4.6 g) were dissolved in ethyl acetate (150 ml) The solution was cooled to 0° C and a solution of dicyclohexylcarbodiimide (8.4 g) in ethyl acetate 50 ml was added with stirring. The stirring was continued for 1 hr in the cold and a further 3 hrs at room temperature. Dicyclohexylurea which precipitated was filtered off and washed with ethyl acetate (25 ml). The combined filtrate and washings were evaporated at a reduced pressure and the residue was dried in high vacuo to a constant weight. The yield of the oily product was 20 g (100%).

POLY(ETHYLENE OXIDE) DIGLYCOLATE

Poly(ethylene oxide) (av. mol. wt. 3000) (50 g) and sodium carbonate (25 g) were dissolved in water (500 ml). A solution of potassium permanganate (12 g) in water (250 ml) was added and the mixture was stirred 18 hrs. at room temperature. The mixture was then filtered and the filtrate was acidified with hydrochloric acid (5 N) to pH 1–2. The water was removed by distillation, the residue was taken in benzene (250 ml) and the last traces of water were removed by azeotropic distillation. Sodium chloride was filtered off and the benzene solution was concentrated to 100 ml. The product was precipitated upon addition of ether (400 ml). The yield was 38 g. Neutral equivalent: 1280 (theoretical: 1500), mp = 48°–50°.

In this example there is obtained a compound of the general formula VI

wherein $n$ is 55. Said compound can also, of course, be represented by the formula VIa

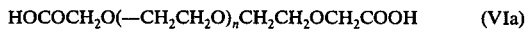

wherein n is 54 and the variations in formula are merely those of convenience.

In a similar manner and by using a different commercially available poly(ethylene oxide) there are obtained compounds of general formula VI wherein n is any value from 2 to 500.

DI-N-HYDROXYSUCCINIMIDE ESTER OF POLY(ETHYLENE OXIDE) DIGLYCOLATE (MX-170)

Poly(ethylene oxide) diglycolate (10.2 g) was dissolved in benzene (100 ml). N-hydroxysuccinimide (920 mg) dissolved in ethyl acetate (100 ml) was added to the benzene solution and after cooling to 0° C a solution of Dicyclohexylcarbodiimide (1.68 g) in ethyl acetate (10 ml) was added. The mixture was stirred at 0° for 1 hour and further 3 hours at room temperature. The mixture was then filtered and the filtrate concentrated at a reduced pressure to 30 ml, ether 250 ml was added and after 1 hr. at 0° the product was collected by filtration, washed with ether and dried. The yield was 9.5 g. M.P. 45°–49°.

DIACID CHLORIDE OF POLY(ETHYLENE OXIDE) DIGLYCOLATE (VIII)

Poly(ethylene oxide) diglycolate (Neutral equiv. 1280) 10 g was dissolved in anhydrous benzene (100 ml). Thionyl chloride (5 ml) and one drop of dimethylformamide were added and the mixture was left for 5 hrs. at room temperature with exclusion of moisture. The mixture was then concentrated under a reduced pressure to about 30 ml and the product was precipitated upon addition of anhydrous ether (200 ml). The product was filtered off, washed with anhydrous ether (100 ml) and dried in vacuo over $P_2O_5$. The yield was 8 g. Analysis calculated for $C_{114}H_{224}O_{58}Cl_2(2590)$: Cl 2.73%. Found Cl 2.76%.

DIAZIDE OF POLY(ETHYLENE OXIDE) DIGLYCOLATE (IX)

(a) Dihydrazide of poly(ethylene oxide) diglycolate (X)

Compound VIII (prepared above) (10 g) was dissolved in anhydrous methanol (50 ml) and the solution was kept 2 hrs. at room temperature. Hydrazin hydrate (3 ml) was added to the solution and the solution was left for a further 5 hours at room temperature. The solution was then evaporated to dryness at a reduced pressure. The residue was taken in benzene (200 ml) and azeotropically distilled. The solution was then filtered off, the filtrate was concentrated at a reduced pressure to about 30 ml. The product was precipitated with ether and dried in vacuum over sulfuric acid. The yield was 9 g. Analysis, calculated for $C_{114}H_{230}O_{58}N_4(2580)$: N 2.16%. Found N 2.25%. M.P. 50°–54°.

(b) Compound IX (This compound is unstable and is prepared only immediately before using it, e.g. for cross-linking).

Compound X (1 g) is dissolved in 1 N HCl (3 ml). The solution is cooled to 0° C and a solution of sodium nitrite (100 mg) in water (1 ml) is added. Urea (100 mg) is added and the solution is neutralized in the cold with 1N sodium hydroxide (3 ml) and is used directly for cross-linking of proteins.

DIHYDROCHLORIDE SALT OF DIIMIDO METHYL ESTER OF POLY(ETHYLENE OXIDE) DIGLYCOLATE (XI)

(a) Dinitrile of poly(ethylene oxide) diglycolate (XII)

Compound VIII (prepared above) (10 g) is added portionwise to a stirred concentrated ammonia solution (100 ml) for 15 minutes. The solution is evaporated at a reduced pressure, the residue is dissolved in benzene (100 ml) and azeotropically distilled. The benzene solution is filtered off and dicyclohexylcarbodiimide (2 g) is added to the filtrate. The reaction mixture is left overnight and then filtered off. The filtrate is concentrated to about 20 ml and the product is precipitated by addition of ether (200 ml). The yield is 8.5 g.

(b) Compound XI

Compound XII (5 g) is dissolved in an anhydrous saturated methanolic HCl solution (50 ml). The solution is left for 2 hours. at room temperature. The product is isolated in the usual manner by concentration in vacuo and precipitation with ether. The product was dried in vacuo over KOH. The yield was 4 g. M.P. 44°–48°.

Analysis calculated for $C_{116}H_{234}O_{58}N_2Cl_2(2654)$: N 1.05, Cl 2.7%. Found: N 1.0, Cl 2.56%.

POLY(ETHYLENE OXIDE)-DI(2-, 4-, OR 6-METHYL-3-ISOCYANATOPHENYL CARBAMATE) (XIII)

A solution of poly(ethylene oxide) (Average mol. wt. 3000) (10 g) in benzene (100 ml) is added dropwise with stirring and exclusion of moisture to a solution of 2,4-diisocyanatotolylene (10 ml) in benzene (200 ml) during 1 hr. The solution is kept at 50° C for 2 hours and then left overnight at room temperature. The solution is then concentrated in vacuo to 50 ml and the product is precipitated with anhydrous ether (200 ml). The product is filtered off, washed with anhydrous ether and dried over $P_2O_5$. M.P. 49°.

Analysis calculated for $C_{154}H_{284}O_{73}N_4(3360)$: N 1.6%. Found: N 1.87%.

The product obtained in fact is a mixture of compounds of the general formula XIII

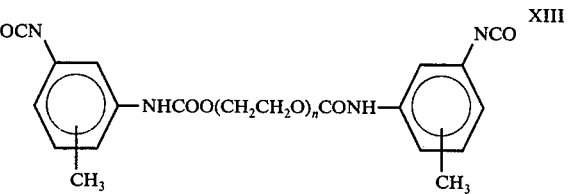

wherein the methyl group is in the 2-, 4-, or 6-position on the phenyl ring.

DI-N-HYDROXYSUCCINIMIDE ESTER OF D-TARTARIC ACID (TDN)

D-tartaric acid (2.36 g) and N-hydroxysuccinimide (4.3 g) were dissolved in dimethylformamide (15 ml). The solution was cooled in an ice bath and an ice cold solution of Dicyclohexylcarbodiimide (8.4 g) in ethyl acetate 25 ml was added with stirring. The stirring was continued for 1 hr in the cold and a further 3 hrs at room temperature. Dicyclohexylurea which precipitated was filtered off and washed with ethyl acetate (25 ml). The combined filtrate and washings were concentrated at a reduced pressure to about 10 ml, ether (200 ml) was added and the mixture was left in the cold overnight. The etheral layer was decanted, the oily residue was dissolved in anhydrous acetone (50 ml) and ether (300 ml) was added. The mixture was left overnight in the cold for complete precipitation of the product. The solid was then collected, washed with a little ether and dried. Yield: 3 g (45%) mp 105° (d).

From the above examples it can be seen that long chain water soluble poly(ethylene oxide) derivatives are prepared by suitable chemical modification of poly(ethylene oxide) by e.g., the following methods:

(a) esterification with dicarboxylic anhydride by reacting 1 mol of poly(ethylene oxide) with at least two mols of the anhydride in anhydrous pyridine (b) oxidation of poly(ethylene oxide) (1 mol) with at least 3 mol of potassium permanganate in dilute aq. sodium carbonate solution.

(c) Carboxymethylation of poly(ethylene oxide) by one of the following methods:
 (i) Reacting poly(ethylene oxide) with at least 2 mol of sodium chloroacetate in aq. sodium hydroxide;
 (ii) Reacting poly(ethylene oxide) (1 mol) with at least 2 mols of ethyl diazoacetate in the presence of $BF_3$ in benzene or dioxane, followed by basic hydrolysis;

(d) Reaction with isocyanato-, or isothiocyanato-benzoic acid, at least 2 mols per 1 mol of poly(ethylene oxide) in benzene or pyridine, optionally in the presence of catalytic amounts of $SnCl_4$.

Similarly the activated esters of carboxylic acids can be prepared by known processes, e.g., by reacting the dicarboxylic acid (1 mol) with the acidic alcohol (2 mol) and with dicyclohexylcarbodiimide (2 mol) in a suitable solvent.

While the invention will now be described in connection with certain preferred embodiments in the following examples it will be understood that it is not intended to limit the invention to these particular embodiments. On the contrary it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are present in the cause of providing what is believed to be the most useful and readily understood description of procedures as well as of the principles and conceptual aspects of the invention.

EXAMPLE 1

Cross-linking of albumin with di-N-hydroxysuccinimide ester of D-tartaric acid (TDN)

Albumin was precipitated from an aqueous solution (10 mg/cc) by the addition of TDN dissolved in acetone (10 mg/0.1cc). A powdery precipitate appeared immediately. It consisted of cross-linked protein.

EXAMPLE 2

Cross-linking of albumin inside a membrane

A solution of albumin (10 mg/cc) was passed through a millipore (0.1 μ) membrane. The membrane was washed briefly and immersed in a cross-linking solution containing TDN (10 mg/cc) in 0.05 M phosphate buffer pH 7.0 (5 ml). The membrane was left in this solution for 2 hours at R.T. It was then washed with 0.05 M phosphate buffer pH 7 until no more u.v. adsorption was found in the wash water. The membrane was analysed for its protein content (Kjeldal method). It contained 3.1 γ N/mg or 19 γ Albumin/mg membrane. In other words, the amount of albumin bound is 2% w/w.

EXAMPLE 3

Cross-linking of a gelatine membrane with various cross-linking agents (a) A gelatine membrane (5×5 cm, cast from a 10% w/v aq. gelatine solution and air dried) was immersed 2 hr in a 10 ml solution containing a phosphate buffer pH 8, 0.05 M and one of the following cross-linking agents (10% w/v): The diazide of poly(ethylene oxide) diglycolate; the diimido methyl ester of poly(ethylene oxide) diglycolate; and di-(2,4-dichlorotriazine) poly(ethylene oxide). The cross-linked membranes thus obtained were then washed with water and air dried. They were insoluble in hot and cold water, but swelled to a considerable extent.

(b) A similar gelatine membrane was immersed in a 10 ml phosphate buffer pH 8 0.05 M and one of the following cross-linking agents was added portionwise during 15 min. to a total amount of 10% w/v: The diacid chloride of poly(ethylene oxide) diglycolate; the diimido methyl ester of poly(ethylene oxide) diglycolate; and poly(ethylene oxide)-di(2-methyl-5 isocyanatophenyl carbamate). The membranes were left for 2 hr and then taken out and washed with water. Similar water-insoluble cross-linked membranes were obtained.

EXAMPLE 4

Preparation of chymotrypsin membranes with various cross-linking agents a. Preparation of chymotrypsin membranes with TDN A chymotrypsin solution containing β-phenyl-propionate as inhibitor (3.3 mg chymotrypsin and 7 mg of inhibitor/cc) in 0.05 M phosphate buffer pH 7.0 was passed through a millipore membrane (0.1 μ). The membrane was washed briefly and immersed in a TDN solution as described above. After two hours it was washed with HCl $10^{-3}$M (to break up the enzyme-inhibitor complex) and buffer until no U.V. and no enzymatic activity were found in the wash water. The membrane was tested for its enzymatic activity at R.T. using Benzoyl-Tyrosine-Ethyl-Ester in 30% Ethanol Tris buffer pH 7.8 (0.05 M) as substrate and measuring the amount of product formed in the effluent.

b. Preparation of chymotrypsin membrane with Di-N-hydroxysuccinimide ester of poly(ethylene oxide) disuccinate (Mx-54)

A chymotrypsin membrane was prepared as described above using Mx-54 (10 mg/cc) instead of TDN in the cross-linking solution. The membrane was washed and analysed above.

c. Preparation of Chymotrypsin membrane with Di-N-hydroxysuccinimide ester of poly(ethylene oxide) diglycolate (Mx-170)

A chymotrypsin membrane was prepared as described above using Mx-170 (10 mg/cc) instead of TDN in the cross linking solution. The membrane was washed and analysed as above. The enzymatic activity of the membranes prepared above are given in Table 1.

TABLE 1

Chymotrypsin membrane (Millipore MF-VC, pore size 0.1μ).
The results are in μmol/min.cm².
Substrate concentration*    $2.5 \cdot 10^{-3}$M

| | Pressure (atm.) | | | Conversion |
|---|---|---|---|---|
| Flow-rate (cc/min/membr.) | 0.5 | 1.2 | 2.7 | % |
| | 3.0 | 6.6 | 13.0 | |
| Cross-linking agent | | | | |
| TDN | 0.61 | 1.17 | 1.7 | 50 |
| Mx-54 | 0.81 | 1.2 | 1.78 | 46 |
| Mx-170 | 0.34 | 0.37 | 0.53 | 60 |

The membrane parameters are: section 10.7 cm², thickness 150μ, porosity 74%

*N-benzoyl-tyrosine ethyl ester

EXAMPLE 5

Preparation of various enzyme-containing membranes using Di-N-hydroxysuccinimide ester of poly(ethylene oxide) diglycolate (Mx-170) as a cross-linking agent A solution of the hereinafter described enzymes (3.3 mg/ml) in 4 ml buffer (see below) was passed through an ultrafiltration membrane (Millipore MF-GS, area: 10.7 cm², thickness 130 μ, porosity 75%, pore size 0.22 μ). The membrane was taken out, washed briefly with water and immersed in a cross-linking solution consisting of Mx-170, (10 mg/cc) dissolved in 0.05 M phosphate buffer (pH 7,5) for 2 hrs. at room temperature. The membrane was then placed in an ultrafiltration cell and washed (see below) until no enzymic activity was found in the wash water.

Asparaginase was dissolved in 0.05 M sodium borate buffer PH 8.5. After cross-linking the membrane was washed with water until the UV of the wash water was 0 and then with the same buffer until no enzymic activity was detected in the wash water.

Trypsin was dissolved in 0.05 M CaCl₂. After cross-linking the membrane was washed with water until no enzymic activity was detected in the wash water.

Catalase was dissolved in a solution of 1% NaCl in 0.05 M phosphate buffer pH 7. After cross-linking the membrane was washed with 10% NaCl (500 ml) and with 0.05 M phosphate buffer pH 7 until no enzymic activity was detected in the wash water.

Urease was dissolved in 0.1 M phosphate buffer, pH 7, containing $10^{-2}$ M EDTA. The same solution was used for washing after cross-linking.

The membranes prepared as described above were then analyzed for their enzymatic activity at R.T. and the results recorded in tables 2–5 hereinafter. In each of the following tables the membrane parameters are: Section 10.7 cm², thickness 130μ, porosity 75%.

TABLE 2

Asparaginase membranes (millipore MF-GS, pore-size 0.22μ).
The results are in μmol/min/cm².

| Substrate concentration (Asparagine) | $1.10^{-2}$M (in borate buffer (0.05M)pH 8.5) | | |
|---|---|---|---|
| Pressure (atm.) | 0.05 | 0.5 | Conversion |
| Flow-rate (cc/min/membr.) | 2 | 36 | % |
| Cross-linking agent | | | |
| Mx-170 | 0.93 | 2.06 | 75 |
| Glutardialdehyde | 0.065 | 0.08 | 5 |

TABLE 3

Trypsin membranes (Millipore MF-VC, pore size 0.1μ). The results are in μmol/min/cm². Substrate concentration $5.10^{-4}$M [N-benzoyl-arginine ethyl ester in tris buffer (0.05 M) pH 8.0 and CaCl₂(0.01M)].

| Pressure (Atm.) | 0.1 | 0.3 | conversion |
|---|---|---|---|
| Flow rate (cc/min/membr.) | 2 | 10 | % |
| Cross-linking agent | | | |
| Mx-170 | 0.9 | 0.21 | 50 |
| Glutardialdehyde | 0.09 | 0.46 | 50 |

TABLE 4

Catalase membrane (Millipore MF-GS, pore size 0.22μ).
The results are in μmol/min/cm².

| H₂O₂ Concentration (pH 7) | 0.0186 M | | 0.0372 M | | con- |
|---|---|---|---|---|---|
| Pressure (atm.) | 0.01 | 0.05 | 0.01 | 0.05 | version |
| Flow rate (cc/min/membr.) | 2 | 18 | 2.5 | 18 | % |
| Mx-170 | 2.7 | 18.2 | 8.8 | 46.9 | 75 |
| Glutardialdehyde | 3.7 | 27 | 7.5 | 39.2 | 50 |

TABLE 5

Urease membrane (Millipore MF-GS, pore size 0.22μ). The results are in μmol/min/cm². Substrate (Urea) concentration $10^{-2}$M (in 0.1M phosphate buffer pH 7 and EDtA $10^{-3}$M).

| Pressure (atm.) | 0.005 | 0.03 | Conversion |
|---|---|---|---|
| Flow rate (cc/min/membr.) | 1 | 10 | % |
| Cross-linking agent: | | | |
| Mx-170 | 1.1 | 1.85 | 60 |
| Glutardialdehyde | 0.09 | — | 5 |

Comparison of the enzymatic activity of the various membranes prepared in Example 5 above with similar membranes prepared with the known cross-linking agent, glutaraldehyde yielded the results shown in Table 6.

TABLE 6

Comparative reaction rates of enzyme membrane cross-linked with Glutardialdehyde (chosen as 1) and Mx-170.

| Enzyme | Catalase | Trypsin | Urease | Asparaginase |
|---|---|---|---|---|
| Crosslinking agent | | | | |
| Glutardialdehyde | 1 | 1 | 1 | 1 |
| Mx-170 | 1.2 | 0.45 | 18.5 | 25.7 |

EXAMPLE 6

Preparation of asparaginase particles using Mx-170 as a cross-linking agent 1 cc of sepharose (4B, particle size 40–190μ) particles (55 mg dry weight) were impregnated with asparaginase (6 mg/ml) in borate buffer (0.05 M, pH 8.5). The particles were then suspended with stirring in a solution of Mx-170 (10 mg/ml) in phosphate buffer (0.05 M, pH 7). for two hours. The particles were rinsed with water and borate buffer until no UV absorption and no enzymic activity were found in the rinse water. The particles were packed into a column (diameter 1.7 cm, height 0.3 cm) and asparagin (0.01M) in borate buffer (0.05 M, pH 8.5) flowed through it. NH₃ was measured in the effluent. The activity of the particles increases with flow rate.

| Flow Rate (Q) ml/min. | Product concentration (P) μM/ml | Reaction Rate (V) μM/min |
|---|---|---|
| 0.25 | 4.6 | 2.3 |
| 1.13 | 3.2 | 3.7 |
| 2.1 | 1.8 | 3.87 |
| 3.6 | 1.1 | 3.86 |

The activity of a 100 mg of particles (dry weight) is 7.0 μM/min.

EXAMPLE 7

Preparation of chymotrypsin particles using Mx-170 as a crosslinking agent 1 cc of Sepharose (4 B, particle size 40-190μ) particles (55 mg dry weight) were impregnated with a dymotrypsin solution (4 mg/cc) containing β-phenyl propionate as inhibitor (7 mg/cc) in phosphate buffer (0.05 M, pH 7.0). The particles were then suspended with stirring in a solution of Mx-170 (10 mg/ml) in phosphate buffer (0.05 M, pH 7.0) for two hours. The particles were rinsed with HCl $10^{-3}$ M (to break up the enzyme-inhibitor complex) and buffer until no UV and no enzymatic activity were found in the wash water. The particles were packed into a column (diameter 1.7 cm, height 0.3 cm) and tested for their activity with Benzoyl-tyrosine-ethyl-ester ($5.10^{-4}$M). The product formed was measured in the effluent. The results are given in the following table:

| Q ml/min | P μM/ml | V μM/min |
|---|---|---|
| 0.43 | 0.186 | 0.087 |
| 0.7 | 0.127 | 0.09 |
| 0.8 | 0.108 | 0.08 |

The activity of 100 mg particles (dry weight) is 0.16 μM/min.

From the above examples it can be seen that the process of the present invention has been and/or can be used to prepare immobilized enzymes of the following categories:

1. Oxidoreductases such as catalase, glucose-oxidase;
2. Hydrolases such as proteases, i.e. Chymotrypsin, trypsin, Carboxypeptidase-B Amino-acid ester hydrolase amidases, i.e. asparaginase urease Carboxylic ester hydrolase, i.e. gluco amylase; and
3. Isomerases such as lysine racemase xylose isomerase; as well as other enzymes, such as those belonging to the classes of transferases, lyases and ligases.

Preferred is a process wherein an enzyme solution is pressed through the pores of a membrane and thereafter the enzyme loaded membrane is immersed into a solution of the cross-linking agents of the present invention, however as stated the process of the present invention can also be used to prepare immobilized proteins and enzymes for particle reactors and other uses which will readily suggest themselves to persons skilled in the art in light of the present description.

It will be evident to those skilled in the art that the invention is not limited to the details of the foregoing illustrative embodiments and examples and that the present invention may be embodied in other specific forms without departing from the spirit or essential attributes thereof, and it is therefore desired that the present embodiments be considered in all respects as illustrative and not restrictive, reference being made to the appended claims, rather than to the foregoing description, in which it is intended to claim all modifications coming within the scope and spirit of the invention.

What is claimed is:

1. A process for the cross-linking of proteins wherein the proteins to be cross-linked are reacted with a cross-linking agent selected from the group consisting of:

(a) water soluble poly(ethylene oxide) derivatives of the general formula I

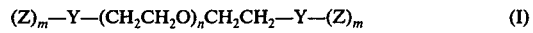
  $$(Z)_m-Y-(CH_2CH_2O)_nCH_2CH_2-Y-(Z)_m \quad (I)$$

wherein both n and m are at least 1; Y is a covalent bond or is an —R— or —RO— radical in which the oxygen is bound to the poly(ethylene oxide) and R is selected from the group consisting of methylene, ethylene, propylene, o—, m— and p-phenylene, o—, m— and p-phenylene carbamate optionally substituted by one or more alkyl, aryl, halo, nitro, oxo, carboxy, hydroxy, thio, sulfonate and phosphate groups; and Z is a reactive group selected from the groups consisting of haloisocyanato-, isothiocyanato-, tosylate, acyl halides, acyl azides, aryl diazonium salts, acyl imidoester salts, activated esters of acyl residues and 2,4-dichlorotriazines; and (b) activated esters of di- and poly-carboxylic acids wherein the acids and the alcohol moieties thereof are water soluble, and wherein the alcohols forming the activated esters are selected from the group consisting of N-hydroxysuccinimide, 1-hydroxy benzotriazole, 8-hydroxyquinoline and 2- and 4-thiopyridine.

2. A process according to claim 1 wherein the proteins to be cross-linked are reacted with a cross-linking agent selected from the group consisting of poly(ethylene oxide) derivatives of the general formula I

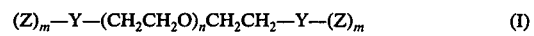
$$(Z)_m-Y-(CH_2CH_2O)_nCH_2CH_2-Y-(Z)_m \quad (I)$$

wherein both n and m are at least 1; Y is a covalent bond or is an —R— or —RD— radical in which the oxygen is bound to the poly(ethylene oxide) and R is selected from the group consisting of methylene, ethylene, propylene, o-, m- and p-phenylene, o—, m— and p-phenylene carbamate optionally substituted by one or more alkyl, aryl, halo, nitro, oxo, carboxy, hydroxy, thio, sulfonate and phosphate groups; and Z is a reactive group selected from the groups consisting of halo-, isocyanato-, isothiocyanato-, tosylate, acyl halides, acyl azides, aryl diazonium salts, acyl imidoester salts, activated esters of acyl residues, and 2,4-dichlorotriazine.

3. A process according to claim 1 wherein the proteins to be cross-linked are reacted with a cross-linking agent selected from the group consisting of water soluble α,ω-dicarboxylic acid derivatives of poly(ethylene oxide) having the general formula II

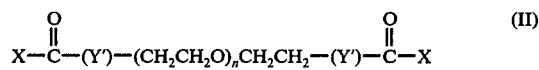
$$X-\overset{O}{\underset{\|}{C}}-(Y')-(CH_2CH_2O)_nCH_2CH_2-(Y')-\overset{O}{\underset{\|}{C}}-X \quad (II)$$

wherein n is at least 1;
Y' is selected from the groups consisting of
  (i) arylene carbamate, optionally substituted by one or more alkyl, aryl, halo and nitro groups
  (ii) -$(CR_1R_2)_pO$ -; and

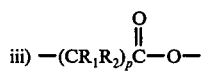
  iii) -$(CR_1R_2)_p\overset{O}{\underset{\|}{C}}-O-$ in which p is at least 1, the oxygen is bound to the poly (ethylene oxide) and $R_1$ and $R_2$ are each selected from the group consisting of hydrogen and halogen atoms, nitro, and carboxyl groups and straight and branch chain alkyl and aryl groups optionally substituted by one or more halogen atoms and nitro and carboxyl groups; and X is halo or azido group or a thio or oxy residue which forms an activated ester with the parent α,ω-dicarboxylic acid.

4. A process according to claim 2 wherein the activated esters of formula I are the esters formed with acidic alcohols selected from the group consisting of o- and p-nitrophenol 2,4- dinitrophenol, N-hydroxy-succinimide, N-hydroxyphthalimide, 2- and 4-thiopyridine, 8-hydroxyquinoline and 1-hydroxybenzotriazole.

5. A process according to claim 2 wherein the activated esters are formed with alcohols selected from the group consisting of N-hydroxysuccinimide, 1-hydroxy benzotriazole, 8-hydroxyquinoline and 2- and 4-thiopyridine.

6. A process according to claim 1 wherein the proteins to be cross-linked are reacted with a cross-linking agent selected from the group consisting of diacid salts of diimido alkyl ester derivatives of poly(ethylene oxide) having the general formula III

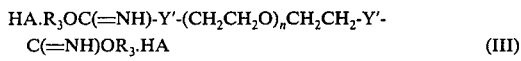
$$HA.R_3OC(=NH)-Y'-(CH_2CH_2O)_nCH_2CH_2-Y'-C(=NH)OR_3.HA \quad (III)$$

wherein n and Y' are as defined in formula II, $R_3$ is an alkyl residue and HA is an acid.

7. A process according to claim 1 wherein the proteins to be cross-linked are reacted with said activated esters of di and poly-carboxylic acids wherein the acids and the alcohol moieties thereof are water soluble, and wherein the alcohols forming the activated esters are selected from the group consisting of N-hydroxysuccinimide, 1-hydroxy benzotriazole, 8-hydroxyquinoline and 2- and 4-thiopyridine.

8. A process according to claim 7 wherein said acids are selected from the group consisting of tartaric acid, citric acid, malic acid, dimethoxysuccinic acid and trimethoxyglutaric acid.

9. A process according to claim 1 wherein said protein is an enzyme.

10. A process according to claim 9 wherein said enzyme is selected from the group consisting of oxido reductases, hydrolases and isomerases.

11. A process according to claim 1 wherein said cross-linking agent is a di-N-hydroxysuccinimide ester of D-tartaric acid.

12. A process according to claim 1 wherein said cross-linking agent is a di-N-hydroxysuccinimide ester of poly(ethylene oxide) disuccinate.

13. A process according to claim 1 wherein said cross-linking agent is a di-N-hydroxysuccinimide ester of poly(ethylene oxide) diglycolate.

14. A process for the cross-linking of proteins as claimed in claim 1 wherein a solid support material is impregnated with an enzyme solution and then suspended in a solution containing the cross-linking agent.

15. A process according to claim 14 wherein said solid support material is particles adapted for packing in a column.

16. A process according to claim 1 wherein a solution containing said protein is passed through a membrane and said membrane is immersed in a solution of the cross-linking agent.

17. A process according to claim 1 wherein a gelatine membrane is immersed in a solution containing said cross-linking agent.

18. A process for the cross-linking of proteins as claimed in claim 1 wherein en enzyme solution is pressed through the pores of a membrane, and thereafter the enzyme loaded membrane is immersed into a solution of the cross-linking agent.

19. A cross-linked protein produced in accordance with the process of claim 1.

20. A cross-linked protein producted in accordance with the process of claim 2.

21. A cross-linked protein produced in accordance with the process of claim 3.

22. A cross-linked protein produced in accordance with the process of claim 4.

23. A cross-linked protein produced in accordance with the process of claim 5.

24. A cross-linked protein produced in accordance with the process of claim 6.

25. A cross-linked protein produced in accordance with the process of claim 7.

26. A cross linked protein produced in accordance with the process of claim 8.

27. A cross-linked protein produced in accordance with the process of claim 9.

28. A cross-linked protein produced in accordance with the process of claim 10.

29. A cross-linked protein produced in accordance with the process of claim 11.

30. A cross-linked protein produced in accordance with the process of claim 12.

31. A cross-linked protein produced in accordance with the process of claim 13.

* * * * *